United States Patent [19]

Willitts, Jr.

[11] Patent Number: 5,406,728

[45] Date of Patent: Apr. 18, 1995

[54] ENCLOSURE WITH FLAT SURFACE

[75] Inventor: William G. Willitts, Jr., Petaluma, Calif.

[73] Assignee: Willitts Designs International, Inc., Petaluma, Calif.

[21] Appl. No.: 66,869

[22] Filed: May 25, 1993

[51] Int. Cl.⁶ .................................... G09F 19/00
[52] U.S. Cl. ................................. 40/409; 40/410
[58] Field of Search .................. 40/409, 410, 411; 359/664

[56] References Cited

U.S. PATENT DOCUMENTS

| | | | |
|---|---|---|---|
| 11,058 | 3/1879 | Brown . | |
| D. 213,150 | 1/1969 | McBain | D80/9 |
| D. 221,010 | 6/1971 | Tavela | D34/11 |
| D. 224,608 | 8/1972 | Okuhara et al. | D86/10 |
| D. 249,089 | 8/1978 | Studley | D64/10 |
| D. 292,095 | 9/1987 | Yoshiharu | D14/64 |
| D. 330,392 | 10/1992 | Vazelle et al. | D20/10 |
| D. 336,061 | 6/1993 | Kraselsky et al. | D11/157 |
| 557,974 | 4/1896 | Conlin et al. . | |
| 1,745,649 | 2/1930 | Stanford et al. . | |
| 1,776,476 | 9/1930 | Murray et al. . | |
| 2,072,841 | 3/1937 | Tracey et al. | 40/130 |
| 2,141,769 | 12/1938 | Simpson | 240/2 |
| 2,549,658 | 4/1951 | Blythe | 40/126 |
| 2,641,683 | 6/1953 | Dupler | 240/2 |
| 2,709,217 | 5/1955 | McCluskey | 240/2 |
| 2,917,853 | 12/1959 | Lawksy | 40/130 |
| 2,957,169 | 10/1960 | White, Jr. | 340/366 |
| 2,975,271 | 3/1961 | Dvorak | 240/147 |
| 3,325,935 | 6/1967 | Holter | 40/106.22 |
| 3,598,988 | 8/1971 | Link | 240/10 R |
| 3,610,918 | 10/1971 | Barlow | 240/2 |
| 3,628,027 | 12/1971 | Brauss | 359/664 |
| 3,802,104 | 8/1974 | Wiley | 40/152 |
| 3,838,858 | 10/1974 | Tummescheit | 373/138 |
| 4,026,066 | 5/1977 | Reiner et al. | 40/411 |
| 4,174,594 | 11/1979 | Panzini | 52/65 |
| 4,521,982 | 6/1985 | Altuchow | 40/407 |
| 4,592,936 | 6/1986 | Ferguson | 428/11 |
| 4,722,037 | 1/1988 | Davis | 362/231 |
| 4,765,623 | 8/1988 | Cardillo et al. | 273/161 |
| 4,771,902 | 9/1988 | Teng | 215/1 R |
| 4,817,311 | 4/1989 | Ong | 40/410 |
| 4,830,454 | 5/1989 | Karstensen | 359/664 |
| 4,852,283 | 8/1989 | Teng | 40/426 |
| 4,947,299 | 8/1990 | Lin | 362/161 |
| 4,961,276 | 10/1990 | Lin | 40/410 |
| 5,088,218 | 2/1992 | Liu | 40/411 |
| 5,090,144 | 2/1992 | Liu | 40/410 |
| 5,092,065 | 3/1992 | Teng | 40/410 |
| 5,105,343 | 4/1992 | Wakimoto | 362/101 |
| 5,110,636 | 5/1992 | Hou | 40/410 |
| 5,131,175 | 7/1992 | Liu | 40/410 |
| 5,187,889 | 2/1993 | Kraselsky et al. | 40/410 |
| 5,258,209 | 11/1993 | Bankert et al. | 428/11 |
| 5,261,848 | 11/1993 | Kaplan | 40/410 |

OTHER PUBLICATIONS

The Greyhound Gift House, 1974, p. 45–hermit crab glass globe.
Hammacher Schlemmer, 1988, p. 47–The Omnidirectional Illuminated Speaker.

*Primary Examiner*—Edward K. Look
*Assistant Examiner*—Mark Sgantzos
*Attorney, Agent, or Firm*—Leydig, Voit & Mayer, Ltd.

[57] ABSTRACT

An enclosure having a flat surface for facilitating the application of an image to the flat surface for viewing. Preferably, the enclosure is spherical except for the flat surface and is attached to a base. The flat surface may be perpendicular to the bottom of the base. The image may be any flat image including a hologram, and may be applied in any manner. The enclosure may be made of glass or plastic, include an object therein, and may be filled with a liquid. The liquid may contain particles such as glitter or particles which resemble snow flakes.

39 Claims, 2 Drawing Sheets

ENCLOSURE WITH FLAT SURFACE

FIELD OF THE INVENTION

The invention relates generally to a decorative device and in particular to an enclosure having a flat surface for applying an image thereto for viewing.

BACKGROUND OF THE INVENTION

Snow globes, or water globes, are popular decorative articles and amusement devices. These globes are normally filled with a clear liquid, typically water, and often include particles which slowly descend through the liquid in a manner resembling snowfall when the globe is inverted or shaken. Typically, the globes are made of glass or plastic. Ordinarily, these globes contain at least one centrally-located three-dimensional figurine for display. Additionally, some globes contain a two-dimensional or three-dimensional background image behind the figurine to enhance the scene. However, although decorative, the background image must either be affixed to or painted on the curved surface of the globe.

It is a time-consuming process to insert a background image within a globe, and a difficult process to properly attach or paint an image onto a spherical surface. Moreover, images on curved glass are significantly distorted as a result of light refraction, which varies the appearance of the background image in dependence on the angle of viewing.

Finally, if instead of an ordinary two-dimensional background image, a holographic film comprising a prerecorded hologram is properly attached to a globe, a desirable image is obtained. However, attaching a hologram to a spherical globe is a difficult task, since holographic film is typically flat and cannot therefore be easily curved to conform to the surface of a sphere.

SUMMARY OF THE INVENTION

Accordingly, it is an object of the invention to provide an enclosure having a substantially flat surface for facilitating the application of an image thereto.

It is a further object of the invention to provide an enclosure having a flat surface for reducing the distortion of the applied image.

It is another object of the invention to provide an enclosure having a flat surface for creating a visual effect such that the applied image appears to be within the enclosure.

It is a resulting feature of the invention that the flat surface enables a hologram to be easily attached.

It is another resulting feature of the invention that the flat surface can serve as a stabilizing base.

Briefly, the invention provides an enclosure that is primarily spherical, but includes a substantially flat surface. Images, including holograms, having at least one flat surface can easily be applied on either the interior or exterior of the flat surface to serve as a background image, such as for an object within the enclosure. Additionally, in certain applications, the flat surface can act as a stabilizing base to prevent the otherwise spherical enclosure from rolling.

Other objects and advantages will become apparent from the following detailed description when taken in conjunction with the drawings.

Figure 1:
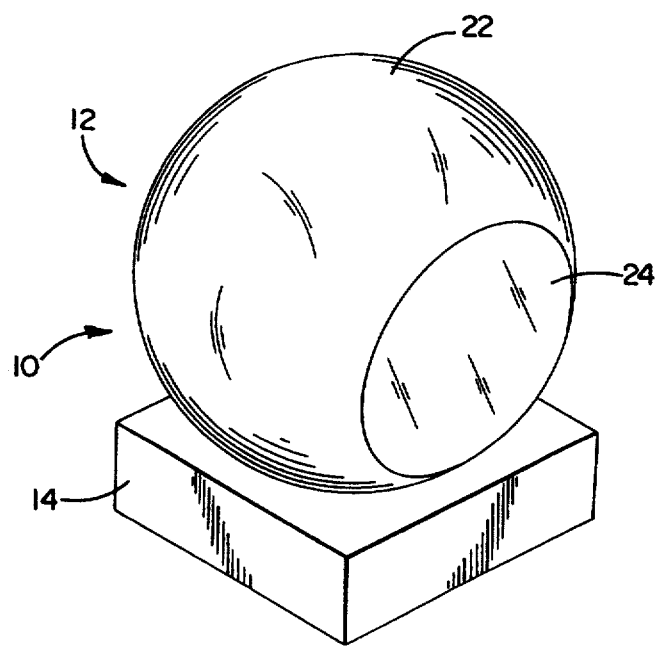
FIG. 1 is a perspective view of the enclosure including the flat surface according to the invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENT

Figure 5:
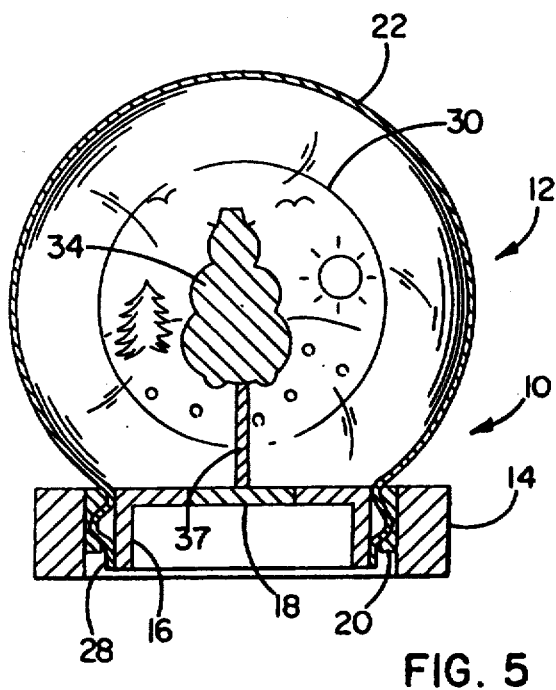
FIG. 5 is a cross sectional view along line 5—5 in FIG. 2.

Turning now to the drawings and referring first to FIG. 1, a decorative device generally designated 10 includes an enclosure 12 and a base 14. The enclosure 12 includes a partial enclosure structure 22 and flat surface 24. In the preferred embodiment the decorative device 10 further includes a neck 28 dimensioned to mate with the base 14 as shown in FIG. 5. Since such enclosures are traditionally filled with a fluid (not shown) such as water, the neck 28 generally provides an open passage until being sealed, such that fluid and other objects can be inserted therethrough.

Referring to FIG. 5, a rubber plug 16 or the like is typically inserted inside the inner wall of the neck 28. The plug 16 may be glued to the inner wall of the neck 28, however, this is generally not necessary with a proper fitting plug. The plug 16 itself may serve as the bottom of the enclosure 12, or may be utilized in conjunction with another object that closes the neck passage 28. For example, a disc-shaped cap 18 can be utilized in conjunction with the rubber plug 16 to seal the neck opening. Preferably, the neck 28 of the enclosure is attached to the base 14 with silicon 20, adhesive or other attaching means.

The enclosure 12 can be made of glass or other suitably transparent material such as plastic. Although in the illustrated embodiment the partial enclosure structure 22 is primarily spherical, any shape having an arcuate outer surface is conceivable such as an ellipsoid.

Figure 2:
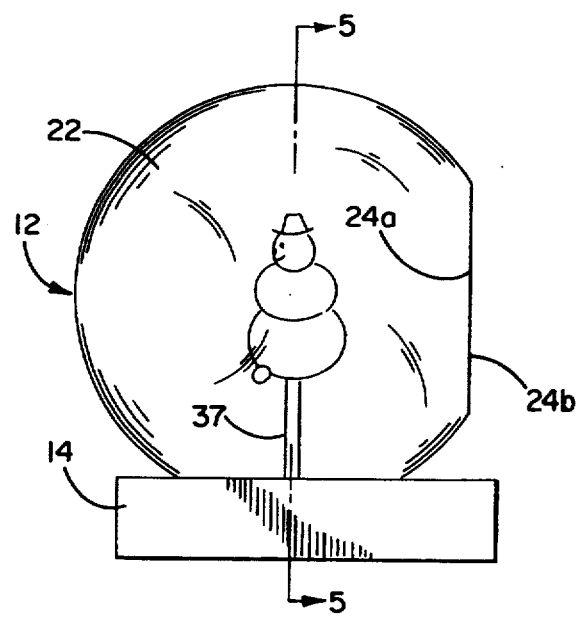
FIG. 2 is a side elevational view of the enclosure illustrating the flat surface according to the invention and showing an object within the enclosure.

The flat surface 24 is preferably transparent, and comprises an inner wall 24a and an outer wall 24b (see FIG. 2). However if images are applied to the inside wall 24a of the surface 24 rather than to the outside wall 24b, the surface 24 need not be transparent. Although the flat surface 24 should be large enough to accommodate a noticeable image, it can readily be appreciated that any ratio of spherical surface area to flat surface area is acceptable. Similarly, the flat surface 24 facilitates the application of an image regardless of the relative size of the device 10.

Figure 6:
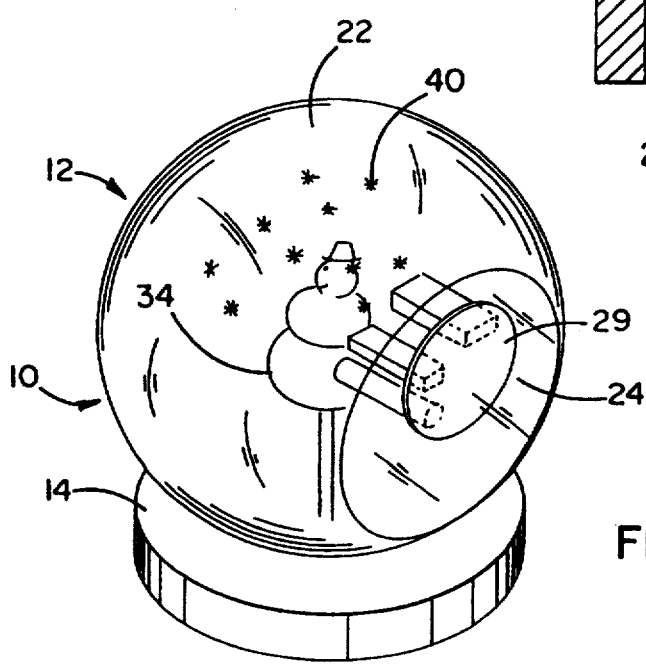
FIG. 6 is a perspective view of an alternate embodiment of the invention illustrating a three-dimensional image applied to the flat surface of the enclosure.

The optional base 14 is preferably plastic, but can be of any suitable material such as wood, resin, metal, stone and porcelain. The base 14 can be opaque, transparent or translucent depending on the overall appearance desired. The base 14 can take any shape, such as the rectangular (including square) base depicted in FIGS. 1-5 or the circular base depicted in FIG. 6, as long as it stabilizes the device 10, i.e., prevents it from freely rolling. To this end, legs (not shown) or feet (not shown) can be included with the base 14.

Figure 3:
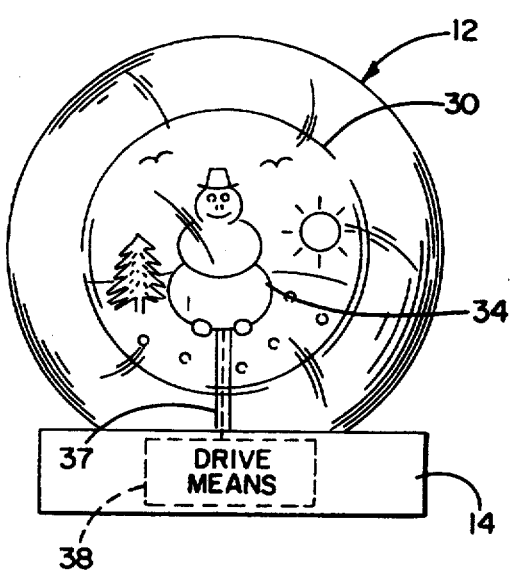
FIG. 3 is a front elevational view through the transparent enclosure showing an object within the enclosure and an image applied to the flat surface.

As shown in FIGS. 2 and 3, an image can easily be applied to the flat surface 24. The image can either be applied to the inner wall 24a or the outer wall 24b. It can be readily appreciated that the surface 24 does not have to be perfectly flat, however, it should be substantially flat in comparison to the surface of the partial enclosure structure 22. Moreover, if the image is applied to the inner wall 24a, the image can possess a relief on the side that is not attached, thereby providing a three-dimensional projection toward the center of the device 10 such as the three-dimensionally projecting image including a relief 29 shown in FIG. 6.

FIG. 3 illustrates one possible image 30 that might be applied to the flat surface 24. Typically, the image is adhered to the wall with glue or the like, although other means of applying an image is acceptable. For example, an image could be screen printed or painted onto the flat surface or the image could be etched or ground into the flat surface. In any case, the image can either be applied to the inner wall 24a or to the outer wall 24b.

Figure 4:
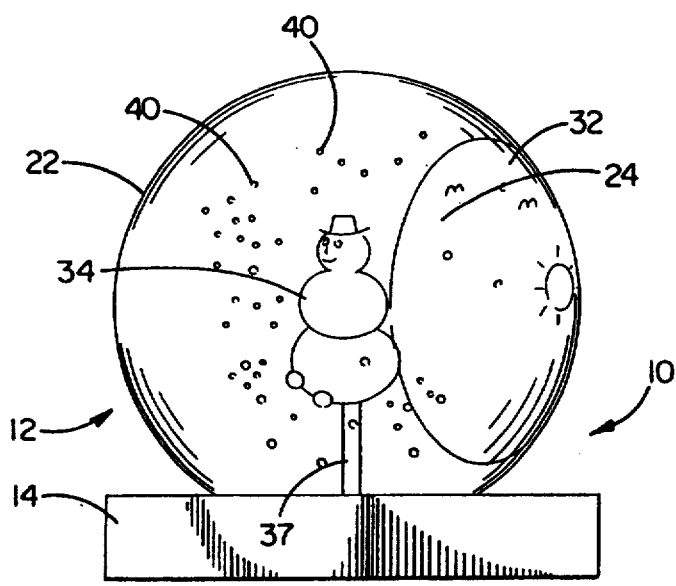
FIG. 4 is a right front elevational view showing the object within the enclosure relative to the image applied to the flat surface.

As shown in FIGS. 3-5, the image can be supplemented with a three-dimensional object 34 such as a figurine or the like disposed in front of the image as viewed through the transparent structure 22. As discussed previously, if a three-dimensional image is attached to the inner wall 24a, it can physically project toward the center of the device 10 as long as the applied side of the image is substantially flat to mate with the flat inner wall 24a, and as long as the projecting image does not physically interfere with the object 34.

Although it is feasible to include an object that freely moves within the enclosure, the object 36 is ordinarily stationary. Accordingly, the object may be rigidly attached to the rubber plug 16, cap 18, or may even be attached to the inner surface of the enclosure. Similarly, the object 36 may have additional support means such as a supporting column 37, so that the object is elevated within the enclosure.

Moreover, it is also possible to move the object 36 in a controlled manner within the enclosure. For example, drive means 38 (see FIG. 3) including a mechanical coupling and a power source such as a battery powered motor, an AC electrically powered motor or a wind-up movement mechanism might move the object 36. For example, the drive means 38 might be configured to rotate the object, oscillate the object, or move the object in a rocking motion. Although such drive means 38 would ordinarily be disposed within the base 14, other locations such as behind the base 14 are feasible. Of course, such mechanical connections from the base to the enclosure would have to be sealed if the enclosure is filled with a liquid.

FIG. 4 illustrates a number of particles 40 descending through a surrounding fluid. The particles 40 may be white, resembling snowfall, such as the snowflakes depicted in FIG. 6, or decorative glitter, or any other size, color, shape and the like depending on the overall appearance desired. Generally, the particles 40 and the viscosity of the fluid are arranged so that when the enclosure is shaken or inverted, the particles 40 descend slowly, i.e., at a rate noticeably less than that of an object falling in a vacuum. It can be readily appreciated that the particles 40 may be included in any of the aforementioned embodiments.

A simple enclosure 12 could be manufactured utilizing glass or molded plastic. The enclosure 12 can be manufactured by forming glass into a less-than-complete sphere, or by grinding or cutting a cross section from a conventional spherical globe and then coupling a flat surface to the globe. Although such a cut is preferably parallel to the vertical axis relative to the base 14, (i.e., perpendicular to the base), the cut could be made along any plane. Due to the opening in the glass or plastic, it is conceivable that objects and images can be inserted through the opening which is cut into a sphere, thereby eliminating the need for the neck passage 28.

A molded plastic enclosure 12 could be manufactured without the need for cutting or grinding of glass and coupling of the flat surface. The plastic enclosure could also be molded in two separate halves and then the two halves would be coupled together. In addition, the plastic enclosure could be blow molded into the desired shape.

Finally, because one surface of the enclosure is flat, the flat surface 24 can serve as a stabilizing base for the structure. Indeed, the enclosure can have more than one flat surface. However, for the flat surface 24 to provide a suitable stabilizing base, the base should be large enough so that the ratio of the flat surface area to the curved surface area provides adequate stabilization when positioned on the flat surface.

As can be seen from the foregoing detailed description, an enclosure having a flat surface for facilitating the application of an image to the enclosure has been provided. The image may stand alone or may be utilized as a background for an additional three-dimensional object for enhancing the object's appearance.

Although the invention has been described with reference to particular embodiments, it will be understood by those skilled in the art that changes can be made without departing from the spirit and scope of the invention. Accordingly, there is no intention to limit the invention to those embodiments, but rather the intention is to cover all embodiments and modifications which fall within the spirit and scope of the invention as defined by the appended claims.

What is claimed is:

1. A decorative device for facilitating the application of an image thereto, comprising:
   a base; and
   an enclosure coupled to said base, the enclosure having a transparent curved surface and at least one substantially flat surface for applying the image to said flat surface, the substantially flat surface at an angle distinct from the angle of the base.

2. The device of claim 1 wherein said base includes a substantially flat bottom for stabilizing the enclosure.

3. The device of claim 1 wherein said flat surface is perpendicular relative to said base.

4. The device of claim 1 wherein said enclosure has multiple flat surfaces.

5. The device of claim 1 further comprising a neck passage formed on the underside of the enclosure, wherein the neck is dimensioned to couple with the base.

6. The device of claim 5 wherein the enclosure is filled with a transparent liquid and the neck passage couples with the base.

7. The device of claim 6 wherein the liquid includes particles.

8. The device of claim 1 wherein the partial curved surface is substantially spherical.

9. The device of claim 1 wherein the image is a hologram.

10. The device of claim 1 wherein said enclosure is made of glass.

11. The device of claim 1 wherein said enclosure is made of plastic.

12. The device of claim 7 wherein said particles resemble snowflakes.

13. The device of claim 7 wherein said particles are glitter.

14. The device of claim 1 wherein said base is made of plastic.

15. The device of claim 1 wherein said base is made of wood.

16. The device of claim 1 wherein said base is made of resin.

17. The device of claim 1 wherein said base is made of porcelain.

18. The device of claim 1 wherein said base is made of metal.

19. The device of claim 1 wherein said image is painted onto said flat surface.

20. The device of claim 1 wherein said image is glued to said flat surface.

21. The device of claim 1 wherein said image is etched into the flat surface.

22. The device of claim 1 wherein said image is a two-dimensional image applied to said flat surface.

23. The device of claim 1 wherein said image is a three-dimensional image applied to said flat surface.

24. The device of claim 1 further comprising an object within said enclosure.

25. The device of claim 24 further comprising drive means coupled to said object for moving the object within the enclosure in a predetermined manner.

26. The device of claim 1 wherein said base has a circular cross section taken parallel to said base.

27. The device of claim 1 wherein said base has a rectangular cross section taken parallel to said base.

28. A decorative device comprising:
a base;
a transparent enclosure mounted on said base, said enclosure having a curved portion and a planar portion, said planar portion substantially perpendicular to said base; and
an image affixed to said planar portion.

29. The device of claim 28 wherein said image is a two-dimensional image.

30. The device of claim 28 wherein said image includes a three-dimensional relief projecting from the flat surface into the enclosure.

31. The device of claim 28 further comprising an object positioned in said enclosure.

32. The device of claim 29 wherein said curved portion is substantially spherical.

33. A decorative display item, comprising:
a base;
a transparent enclosure which is sealed and filled with a transparent fluid and mounted on said base, said enclosure having a spherical portion and a planar portion forming a hollow globe with a flat portion, said flat portion substantially perpendicular relative to said base; and
an image affixed to the flat portion.

34. The device of claim 28 wherein said image includes a three-dimensional object.

35. The device of claim 33 wherein said image includes a three-dimensional relief projecting from the flat portion into the enclosure.

36. The device of claim 33 wherein said image includes a three-dimensional object.

37. The device of claim 1 wherein said enclosure is sealed and filled with a transparent fluid and mounted on said base, and wherein the curved surface is substantially spherical and the flat surface is substantially planar forming a hollow globe with a flat portion, said flat portion substantially perpendicular relative to said base.

38. The device of claim 1 wherein the enclosure has an opening therein at an angle distinct from the angle of the flat surface, and wherein the enclosure is coupled to the base at said opening.

39. A decorative device, comprising:
a base;
an enclosure coupled to said base, the enclosure having a transparent curved surface and at least one substantially flat surface at an angle distinct from the angle of the base; and
a hologram attached to said flat surface.

* * * * *

UNITED STATES PATENT AND TRADEMARK OFFICE
CERTIFICATE OF CORRECTION

PATENT NO. : 5,406,728
DATED : April 18, 1995
INVENTOR(S) : William G. Willitts, Jr.

It is certified that error appears in the above-indentified patent and that said Letters Patent is hereby corrected as shown below:

On the title page: Item [57]

Under "U.S. Patent Documents"
D.330,392 10/1992 "Vazelle et al." should be --Vazeille et al.--

Column 2, line 3, before "perspective" insert --rear--.

Column 6, line 14, delete "claim 29" and substitute therefor --claim 28--.

Signed and Sealed this

Twenty-seventh Day of June, 1995

Attest:

BRUCE LEHMAN

Attesting Officer

Commissioner of Patents and Trademarks